(12) United States Patent  (10) Patent No.: US 7,899,642 B2
Rowse et al.  (45) Date of Patent:  Mar. 1, 2011

(54) OPTIMIZED RFID/NFC BER TESTING

(75) Inventors: Graham Rowse, Farnborough (GB); Joe Pendlebury, Island (GB)

(73) Assignee: Nokia Corporation, Espoo (FI)

( * ) Notice: Subject to any disclaimer, the term of this patent is extended or adjusted under 35 U.S.C. 154(b) by 1506 days.

(21) Appl. No.: 11/178,432

(22) Filed: Jul. 12, 2005

(65) Prior Publication Data

US 2007/0014341 A1  Jan. 18, 2007

(51) Int. Cl.
*G01M 19/00* (2006.01)
(52) U.S. Cl. ........................................ 702/122
(58) Field of Classification Search .................. 702/122
See application file for complete search history.

(56) References Cited

U.S. PATENT DOCUMENTS

2002/0196029 A1* 12/2002 Schmidt ............... 324/500
2004/0042407 A1  3/2004 Karacclik et al.
2004/0176032 A1* 9/2004 Kotola et al. .............. 455/41.2

FOREIGN PATENT DOCUMENTS

EP  1335536 A1  8/2003
WO  2005004513 A1  1/2005

OTHER PUBLICATIONS

PCT International Search Report, Jan. 29, 2007, 14 pages.
* cited by examiner

*Primary Examiner*—Aditya Bhat
(74) *Attorney, Agent, or Firm*—Locke Lord Bissell & Liddell

(57) ABSTRACT

A system and method for testing communication performance between two wireless communication devices. A value table is used to determine a test string in both the unit under test and another wireless device. An initiating device transmits data to the secondary device, which may check the incoming data for errors against an "expected" data string. The secondary device may then correct the incoming data (if necessary) and transmit it back to the initiating device. The initiating device may check this data and combine it with data from the secondary device in order to determine an overall bit error rate (BER) and/or packet error rate (PER).

47 Claims, 10 Drawing Sheets

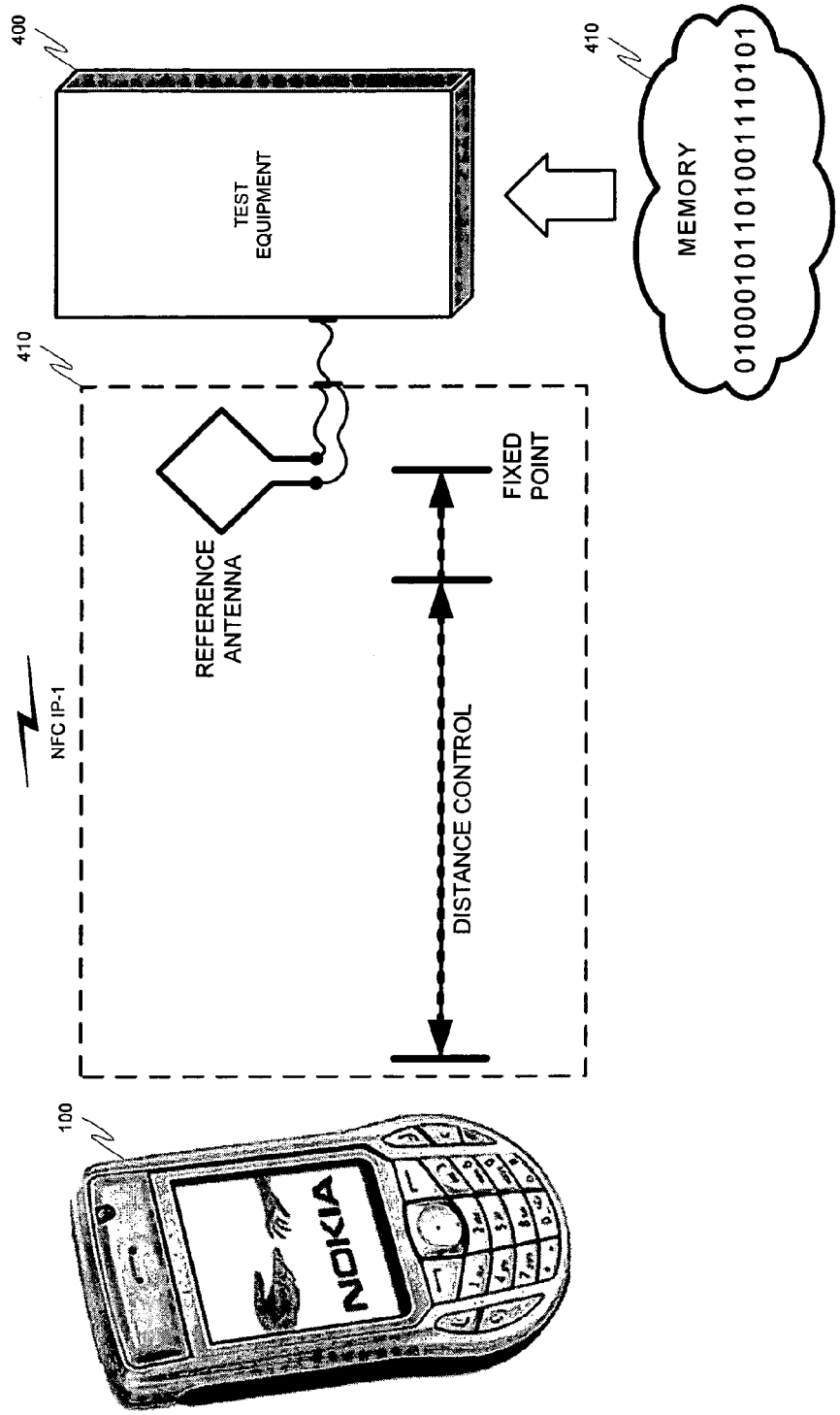

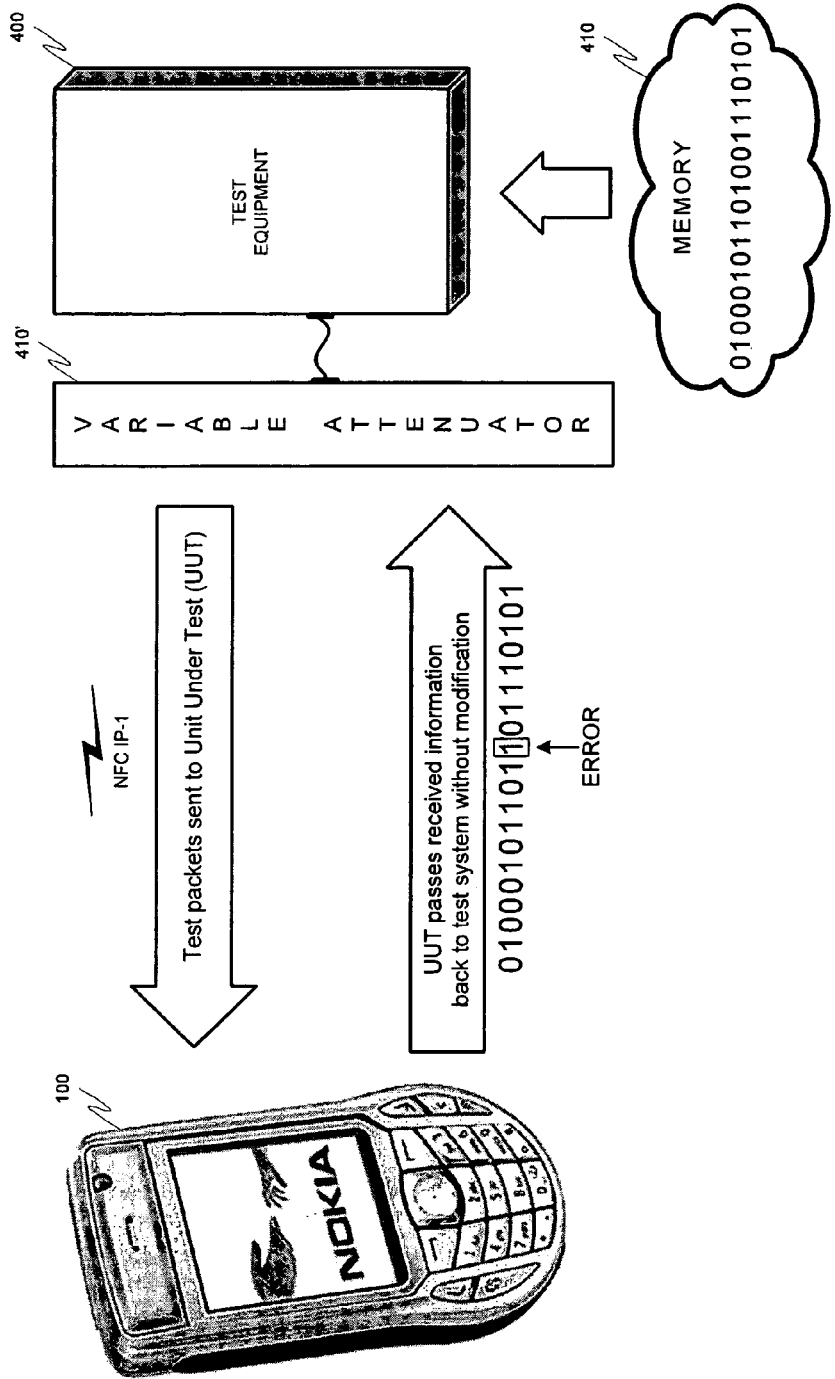

The full data table -- its only 256 Bytes

HEXADECIMAL VALUES

| Key | 00 | 01 | 02 | 03 | 04 | 05 | 06 | 07 | 08 | 09 | 0A | 0B | 0C | 0D | 0E | 0F |
|-----|----|----|----|----|----|----|----|----|----|----|----|----|----|----|----|----|
| 00  | 52 | 82 | 23 | E8 | EC | E5 | D1 | 04 | 78 | 85 | 07 | 6E | 68 | 77 | A1 | DE |
| 01  | 98 | 35 | 6D | 6F | F9 | B0 | 9C | 06 | C6 | 3B | A5 | 91 | 4E | 1C | 0E | 25 |
| 02  | 03 | 08 | 48 | D2 | 31 | 89 | B4 | 2E | BB | 11 | 1B | 10 | E6 | 84 | 47 | 65 |
| 03  | A6 | 9B | EB | AC | F2 | 38 | 3D | DA | EC | 2A | BD | 56 | CD | 0F | 80 | F4 |
| 04  | DF | 54 | EE | 5A | 2D | E2 | 73 | 76 | 53 | 8F | 17 | A9 | A8 | DB | 83 |
| 05  | 60 | F3 | AB | 0C | C8 | 70 | 39 | A7 | 0D | D3 | CE | E3 | 50 | 95 | 5C | B6 | 5E |
| 06  | B8 | AA | EE | 2B | 99 | 93 | 34 | 5D | 1F | 7C | 62 | 59 | 7F | 40 | 87 | 3A | 2C |
| 07  | BA | BC | 94 | 7E | CC | 34 | D9 | 02 | 96 | 14 | E4 | B7 | 64 | 43 | E9 | E7 | 72 | 8D |
| 08  | C5 | 2F | 4B | 4D | 09 | 21 | 67 | C7 | 51 | 66 | DD | 4F | 9F | FB | 1E | 8B | B5 | 3C |
| 09  | 4C | CA | C0 | 27 | 33 | 1D | 46 | A2 | 24 | 26 | C4 | 79 | 41 | 6A | 75 | 1A |
| 0A  | 28 | AF | 00 | 7A | 97 | 58 | 9A | 9D | FF | A4 | A3 | A0 | 0B | 5F | 45 | 61 | BF |
| 0B  | B1 | C9 | C3 | 8E | CF | C1 | 01 | F1 | 8A | D6 | 13 | FD | D0 | 42 | D5 | 7D |
| 0C  | 22 | F0 | 86 | 90 | 19 | 74 | ED | 3F | 16 | 0A | AE | 36 | EF | EA | F7 | DC |
| 0D  | F8 | B2 | F6 | 6B | E1 | D8 | 4A | 6C | 05 | 49 | 5B | 57 | EA | 29 | 44 | 30 |
| 0E  | F5 | FE | D4 | 55 | 63 | 8C | 15 | 3E | 12 | 92 | E0 | 88 | D7 | 7B | B9 | CB |

BINARY TEST DATA = 01001011 + 00110111 + 11011010 + 10101110 + 10011110

FIG. 6

OPTIMIZED RFID/NFC BER TESTING

BACKGROUND OF INVENTION

1. Field of Invention

The present invention relates to wireless communication. More particularly, the invention is related to an improved system for bit error rate (BER) and packet error rate (PER) testing of wireless short-range communications between two devices.

2. Description of Prior Art

A wireless communication device (WCD) may communicate over a multitude of networks. Cellular networks facilitate WCD communications over large geographic areas. For example, the Global System for Mobile Telecommunications (GSM) is a widely employed cellular network that communicates in the 900 MHZ-1.8 GHZ band in Europe and at 1.9 GHZ in the United States. This system provides a multitude of features including audio (voice), video and textual data communication. For example, the transmission of textual data may be achieved via the Short Messaging Service (SMS). SMS allows a WCD to transmit and receive text messages of up to 160 characters. It also provides data transfer to packet networks, ISDN and POTS users at 9.6 Kbps. While cellular networks like GSM provide a global means for transmitting and receiving data, due to cost, traffic and legislative concerns, a cellular network may not be appropriate for all data applications.

Bluetooth™ is a short-range wireless network technology quickly gaining acceptance in the marketplace. A Bluetooth™ enabled WCD may transmit and receive data at a rate of 720 Kbps within a range of 10 meters, and may transmit up to 100 meters with additional power boosting. A user does not manually instigate a Bluetooth™ wireless network. A plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other members of the piconet.

More recently, manufacturers have began to incorporate various devices for providing enhanced functionality in a WCD (e.g., hardware components and software for performing close-proximity wireless information exchanges). Sensors and/or scanners may be used to read visual or electronic information into a device. A transaction may involve a user holding their WCD in proximity to a target, aiming their WCD at an object (e.g., to take a picture), sweeping the device over a tag or document, etc. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Short-range communication strategies are ideal for entities seeking to deliver data to information consumers in a certain geographic area. These systems operate mostly in unregulated bands, and may be a cost-effective solution for the generalized dissemination of information. In the case of Radio Frequency communications, the Near Field Communication protocol (NFC IP-1), which received approval under standard ISO/IEC IS 18092 in 2003, uses the 13.56-MHz wavelength, and is composed of a physical layer and data link layer. When devices with an NFC IP-1 compatible chip are brought within 10 centimeters, they can recognize each other and exchange information. This highly intuitive method for communication contrasts previous methods where devices have to be identified by icons on computer screens or selected within Bluetooth networks or WLANs.

While these beneficial characteristics make NFC IP-1 communications ideal for many applications, the actual usefulness of radio frequency communication methods may be limited by the reliability of the wireless connection. Devices must be able to quickly establish a stable communication link, even over a maximum permitted distance, in order to obtain the desired information. Otherwise, the resources applied to provide this information are wasted.

One way to verify the quality of short-range communications is through testing. Current methods require test equipment in controlled conditions in order to determine communication quality. A WCD to be analyzed, also called a unit under test (UUT), may be evaluated by sending NFC IP-1 frames or packets from a test or reference system to the device. The UUT in turn relays the received information back to the test system (loopback). The test system may then check the information to determine positions containing flipped bits (e.g., a "1" that should have been a "0" and vice versa). The tally of these incorrect bits is used to derive a bit error rate (BER) that may be used to evaluate the performance of the UUT. For NFC IP-1 and RFID systems, the system performance is only defined in the connection to the reference antenna that is defined. Therefore, due to different antenna size or shapes of the two connecting items, the near end and far end transmissions are best considered as two independent connections that, as a result, have different performances.

The current testing methods, while effective to evaluate overall connection quality, are not well equipped to help a user pinpoint the source of an error. There is also no standardization for these tests, requiring a custom set-up according to the circumstances of each particular test. Finally, special equipment and software (e.g., a test program used to send test packets) may not be readily available to all users who desire to debug a device (e.g., a field technician). Currently, providing these test resources for all WCD users may be prohibitive due to the additional resource overhead required in the device. This additional space for equipment and/or software may require substantial redesign and cost escalation for the device.

What is needed, and not found within the prior art, is a simplified method to test wireless communication devices so that error statistics may be derived that help define the source of an error. The requirements for the testing (hardware and software) should be standardized so that the test may be run between a multitude of different devices. Finally, the software required for the test should be both flexible and compact so that devices of different capabilities can run different tests in order to determine whether short-range communication resources are operating within specification.

SUMMARY OF INVENTION

The present invention consists of a method, apparatus, computer program and system for testing wireless communication in a device. More specifically, the invention includes an improved method for evaluating the performance of both transmission and reception between two devices capable of wireless short-range communication.

In at least one embodiment of the invention, all wireless communication devices contain a compact test data generation table that may be accessed as a source of sample data during testing. This value table and applicable test software require little resources, may be permanent or installed as needed, and may be the same for all devices.

The initiating device receives a trigger event causing it to send a request to another wireless communication device in transmission range. The request may be accompanied by information related to test parameters and a test data generation table address called a "seed" address. The receiving device may then access a locally-stored version of the test data generation table stored in memory to determine the contents of the seed address. The address contents may indicate the next address to be accessed, allowing the devices to synchronize based on an "expected" next value. The devices may then progress in tandem through the table as packets are passed between devices.

Based on the seed address and the test parameters, the secondary device may act in a predictive manner to verify that the information received during the test is the information that is expected. Errors may be used to compute a transmission phase BER, which may be used to calculate an overall test result after the test is concluded. The secondary device may then correct any bit errors encountered and send the "expected" packet information back to the originating WCD.

In this way, the overall test information may segregate packet errors occurring on the transmission phase (initiating device to the secondary device) from the reception phase (secondary device back to the initiating device). The capturing of this precise error information allows a user to pinpoint where errors in transmission occur, and may indicate a known problem, and accordingly, a possible solution.

Further embodiments include a secondary device that is not a traditional WCD. Secondary devices may include any commercial device capable of wireless communication using the NFC IP-1, IP-2 (in development) or any corresponding existing or future protocol. The intelligence and features of these devices may in turn determine whether the test can be optimized to increase test speed, or may be enhanced to provide other testing options. Available options include running a multitude of both traditional and modified tests in accordance with the present invention. Packet errors may be tallied on the wireless communication devices involved in the test, and are not limited to frame errors, Cyclic Redundancy Check (CRC) errors, Header Oversize and Undersize counters that starts the process of error location, etc. These errors may also be tallied over time to present histogram results.

DESCRIPTION OF DRAWINGS

The invention will be further understood from the following detailed description of a preferred embodiment, taken in conjunction with appended drawings, in which:

FIG. 4A is an exemplary representation of a typical communication quality test performed between a wireless communication device and a specialized test system.

FIG. 4B is a general representation of a typical communication quality test performed between a wireless communication device and a specialized test system.

FIG. 6 is a representation of an exemplary test data generation table usable in at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Device

Figure 1:
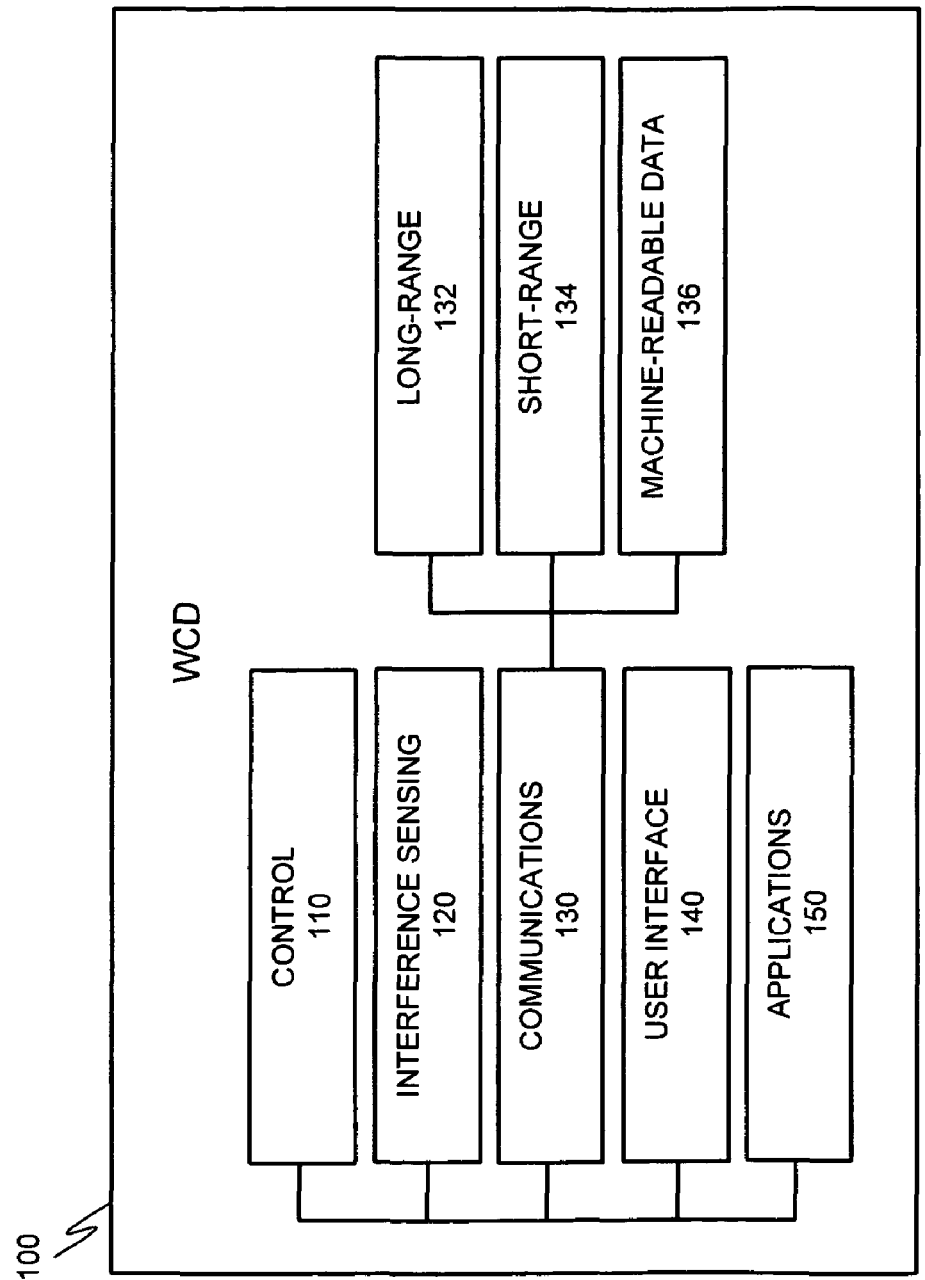
FIG. 1 is a modular representation of a wireless communication device usable in at least one embodiment of the present invention.

FIG. 1 discloses an exemplary modular layout for a wireless communication device usable with the instant invention. WCD 100 is broken down into modules representing the functional aspects of the device. These functions may be performed by the various combinations of software and/or hardware components discussed below.

Control module 110 regulates the operation of the device. Inputs may be received from various other modules included within WCD 100. For example, interference sensing module 120 may use various techniques known in the art to sense sources of environmental interference within the effective transmission range of the wireless communication device. Control module 110 interprets these data inputs and in response may issue control commands to the other modules in WCD 100.

Communications module 130 incorporates all of the communications aspects of WCD 100. As shown in FIG. 1, communications module 130 includes for example long-range communications module 132, short-range communications module 134 and machine-readable data module 136. Communications module 130 utilizes at least these sub-modules to receive a multitude of different types of communication from both local and long distance sources, and to transmit data to recipient devices within the broadcast range of WCD 100. Communications module 130 may be triggered by control module 110 or by control resources local to the module responding to sensed messages, environmental influences and/or other devices in proximity to WCD 100.

User interface module 140 includes visual, audible and tactile elements which allow the user of WCD 100 to receive data from, and enter data into, the device. The data entered by the user may be interpreted by control module 110 to affect the behavior of WCD 100. User inputted data may also be transmitted by communications module 130 to other devices within effective transmission range. Other devices in transmission range may also send information to WCD 100 via communications module 130, and control module 110 may cause this information to be transferred to user interface module 140 for presentment to the user.

Applications module 150 incorporates all other hardware and/or software applications on WCD 100. These applications may include sensors, interfaces, utilities, interpreters, data applications, etc., and may be invoked by control module 110 to read information provided by the various modules and in turn supply information to requesting modules in WCD 100.

Figure 2:
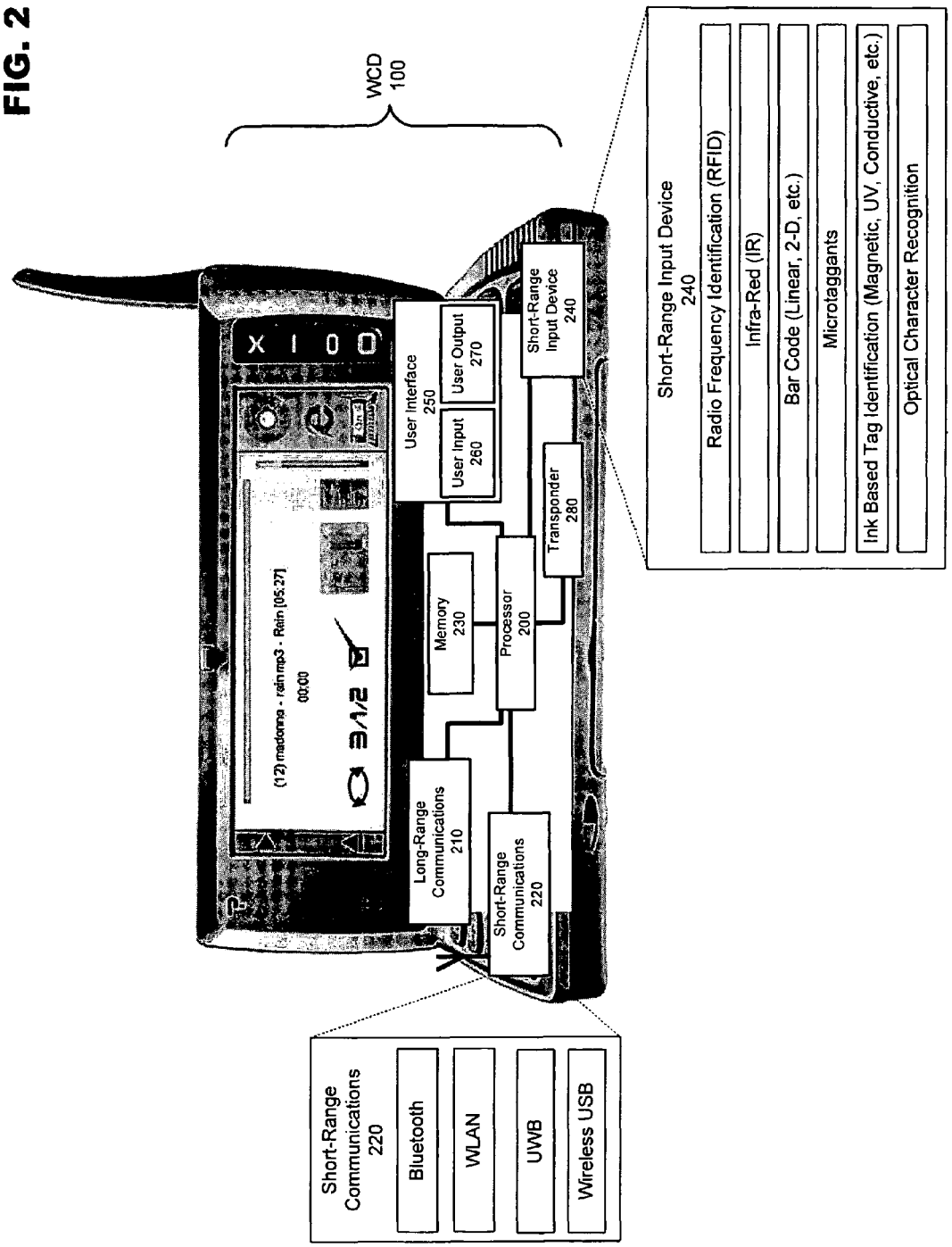
FIG. 2 is a functional representation of the wireless communication device of FIG. 1, which is usable in at least one embodiment of the present invention.

FIG. 2 discloses an exemplary structural layout of WCD 100 according to an embodiment of the present invention that may be used to implement the functionality of the modular system previously described. Processor 200 controls overall device operation. As shown in FIG. 2, processor 200 is coupled to communications sections 210, 220 and 240. Processor 200 may be implemented with one or more microprocessors that are each capable of executing software instructions stored in memory 230.

Memory 230 may include random access memory (RAM), read only memory (ROM), and/or flash memory, and stores information in the form of data and software components (also referred to herein as modules). The data stored by memory 230 may be associated with particular software components. In addition, this data may be associated with databases, such as a bookmark database or a business database for scheduling, email, etc.

The software components stored by memory 230 include instructions that can be executed by processor 200. Various types of software components may be stored in memory 230. For instance, memory 230 may store software components that control the operation of communication sections 210, 220 and 240. Memory 230 may also store software components including a firewall, a service guide manager, a bookmark database, user interface manager, and any communications utilities modules required to support WCD 100.

Long-range communications 210 performs functions related to the exchange of information across large coverage area networks (such as cellular networks) via an antenna. Therefore, long-range communications 210 may operate to establish data communications sessions, such as General Packet Radio Service (GPRS) sessions and/or Universal Mobile Telecommunications System (UMTS) sessions. Also, long-range communications 210 may operate to transmit and receive messages, such as short messaging service (SMS) messages and/or multimedia messaging service (MMS) messages.

Short-range communications 220 is responsible for functions involving the exchange of information across short-range wireless networks. As described above and depicted in FIG. 2, examples of such short-range communications 220 are not limited to Bluetooth™, WLAN, UWB and Wireless USB connections. Accordingly, short-range communications 220 performs functions related to the establishment of short-range connections, as well as processing related to the transmission and reception of information via such connections.

Short-range input device 240, also depicted in FIG. 2, may provide functionality related to the short-range scanning of machine-readable data. For example, processor 200 may control short-range input device 240 to generate RF signals for activating an RFID transponder, and may in turn control the reception of signals from an RFID transponder. Other short-range scanning methods for reading machine-readable data that may be supported by the short-range input device 240 are not limited to IR communications, linear and 2-D bar code readers (including processes related to interpreting UPC labels), and optical character recognition devices for reading magnetic, UV, conductive or other types of coded data that may be provided in a tag using suitable ink. In order for the short-range input device 240 to scan the aforementioned types of machine-readable data, the input device may include optical detectors, magnetic detectors, CCDs or other sensors known in the art for interpreting machine-readable information.

Further shown in FIG. 2, user interface 250 is also coupled to processor 200. User interface 250 facilitates the exchange of information with a user. FIG. 2 shows that user interface 250 includes a user input 260 and a user output 270. User input 260 may include one or more components that allow a user to input information. Examples of such components include keypads, touch screens, and microphones. User output 270 allows a user to receive information from the device. Thus, user output portion 270 may include various components, such as a display, Light emitting diodes (LED), tactile emitters and one or more audio speakers. Exemplary displays include liquid crystal displays (LCDs), and other video displays.

WCD 100 may also include a transponder 280. This is essentially a passive device which may be programmed by processor 200 with information to be delivered in response to a scan from an outside source. For example, an RFID scanner mounted in a entryway may continuously emit radio frequency waves. When a person with a device containing transponder 280 walks through the door, the transponder is energized and may respond with information identifying the device, the person, etc.

Hardware corresponding to communications sections 210, 220 and 240 provide for the transmission and reception of signals. Accordingly, these portions may include components (e.g., electronics) that perform functions, such as modulation, demodulation, amplification, and filtering. These portions may be locally controlled, or controlled by processor 200 in accordance with software communications components stored in memory 230.

The elements shown in FIG. 2 may be constituted and coupled according to various techniques in order to produce the functionality described in FIG. 1. One such technique involves coupling separate hardware components corresponding to processor 200, communications sections 210 and 220, memory 230, short-range input device 240, user interface 250, transponder 280, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 250 may interact with a communications utilities software component, also contained in memory 230, which provides for the establishment of service sessions using long-range communications 210 and/or short-range communications 220. The communications utilities component may include various routines that allow the reception of services from remote devices according to mediums, such as the Wireless Application Medium (WAP).

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

II. Existing Test Systems

The WCD disclosed in FIGS. 1 and 2 may be employed by a user to transmit and receive information over long and short distances. While the disclosed exemplary implementation refers to radio frequency communication operating at a frequency of 13.56 MHz using the NFC IP-1 communication protocol, the present invention is not limited to this embodiment, and may be used to test RF communication using other protocols, such as the NFC IP-2 protocol still in development, and any other corresponding existing or future form of wireless communication with similar operating characteristics. Current testing procedures do not test the functioning of a specific transmission or reception. Instead, a "loopback" communication transaction is performed involving both phases, and the overall error rate of the transaction is used to judge the reliability of the wireless communication.

Figure 3:
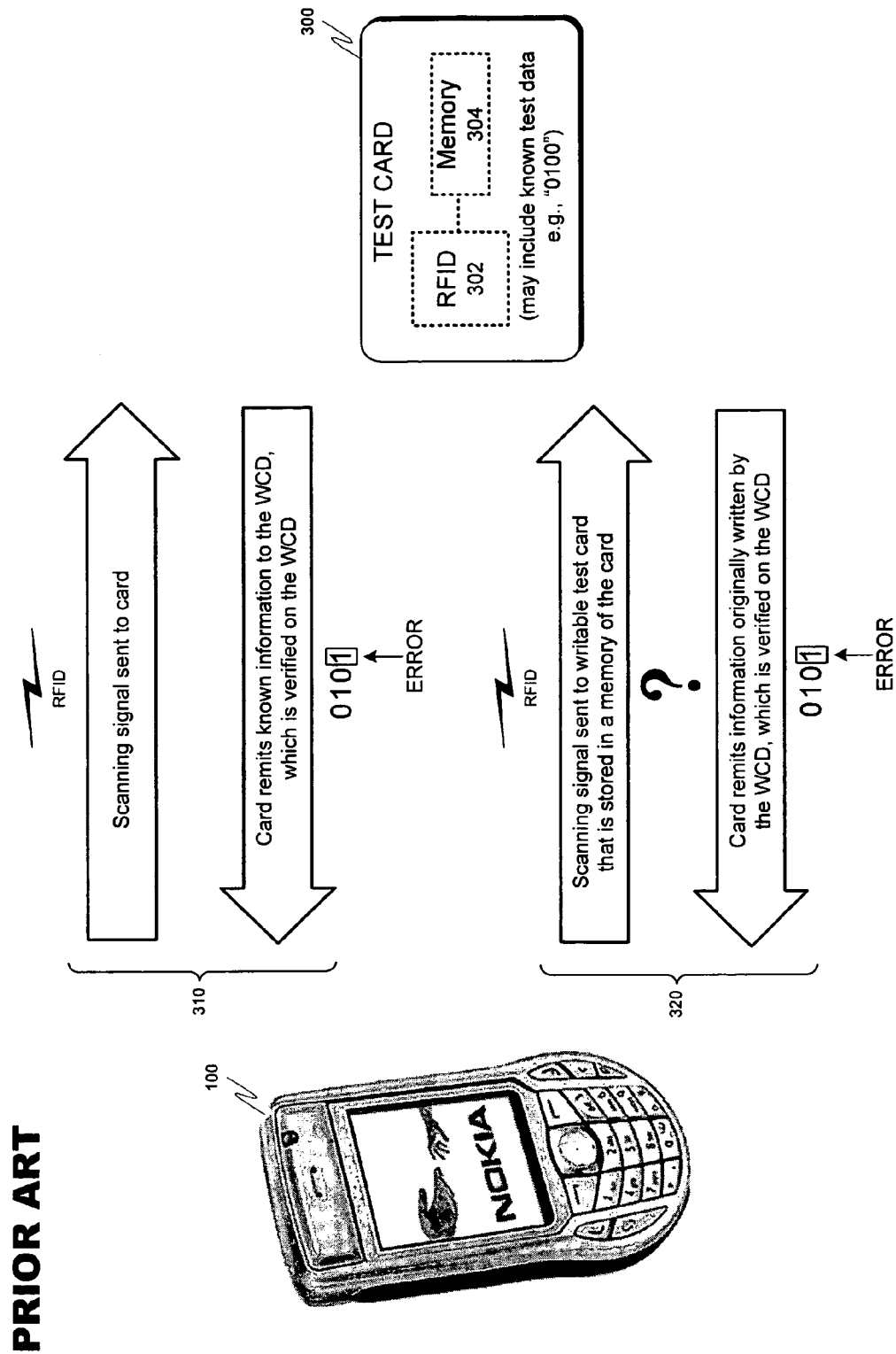
FIG. 3 is a representation of typical communication quality tests utilizing a test card with a wireless communication device.

FIG. 3 describes at least one example of conventional BER testing. In FIG. 3, WCD 100 is performing communication tests utilizing a test card 300. Test card 300 may be composed of an RFID chip 302 and a memory 304. These components may be individual devices, or may be included in the same semiconductor chip. Memory 304 may be static or dynamic. In the case of static memory, the UUT (in this case WCD 100) would execute the test described at 310. The UUT scans test card 300. The electromagnetic scanning signal induces a voltage on test card 300, supplying power to RFID chip 302 and memory 304. The RFID chip 302 responds by providing the data permanently stored on memory 304 to the scanning device. The user may then visually or electronically verify that the data received by the UUT is the expected data. In this case, the card may include a visual indicia showing a code (e.g., "0100") which is compared to the data received by the UUT. In the FIG. 3 example, the WCD 100 received "0101" indicating that there was an error in the transaction. The test shown at 320 is a similar but slightly more automated. The WCD 100 writes information to the test card 300. The information may be a test packet or frame including random test data. Test card 300 stores the test string in memory 304. The UUT may then scan test card 300 again and read back the previously stored data. The read-back data is compared to the data initially written, and a BER may be calculated based on these results. The inherent weaknesses in these test are the requirement for a special test device (e.g., test card 300) and the inaccuracy of the results. The BER in this case only describes the errors in the round trip transaction. There is no ability to pinpoint where the error actually occurred.

FIG. 4A demonstrates an improvement over the previous system. The passive card is replaced by test equipment 400. The UUT (WCD 100) and test equipment 400 may communicate via various short-range and/or machine readable methods such a Bluetooth, WLAN, RF, IR, etc. In the exemplary case of FIG. 4A, the devices transfer information via short-range communication. In this commonly used test scenario, test equipment 400 contains a process for modulating the attenuation a communication signal that is demonstrated at 410. A reference antenna with a fixed radiation power setting is attached to the test equipment, and variable signal attenuation is achieved by controlling the distance between the fixed antenna and the UUT. The testing would then be performed at defined distance increments between the reference antenna and the UUT as shown at 410.

FIG. 4B demonstrates a testing process that may be used to test communications quality at each distance increment of FIG. 4A. The exemplary method for attenuating the signal disclosed at 410 in FIG. 4A has been replaced by a variable attenuator 410' in FIG. 4B. This device is used to change the characteristics of the antenna on the test equipment to simulate different distances. For example, the variable attenuator may change the physical dimensions or electrical characteristics of the antenna so as to lessen the strength of the scanning energy sent to, and received from, test equipment 400. In this way, physical distance or environmental factors may be simulated in a fixed setting, such as a test lab. Test equipment 400 transmits test data stored in memory 410 to the UUT (WCD 100). The UUT responds by transmitting exactly what was received back to test equipment 400 (also called "loopback"). The sending device compares the returned data to the initially sent data still stored in memory 410 and determines if there are any errors. In the depicted test case it appears that the twelfth bit should be a "0" but was received as a "1". This error would be tallied to determine a BER and/or PER.

III. Communications Testing Between Two Wireless Communication Devices

Figure 5:
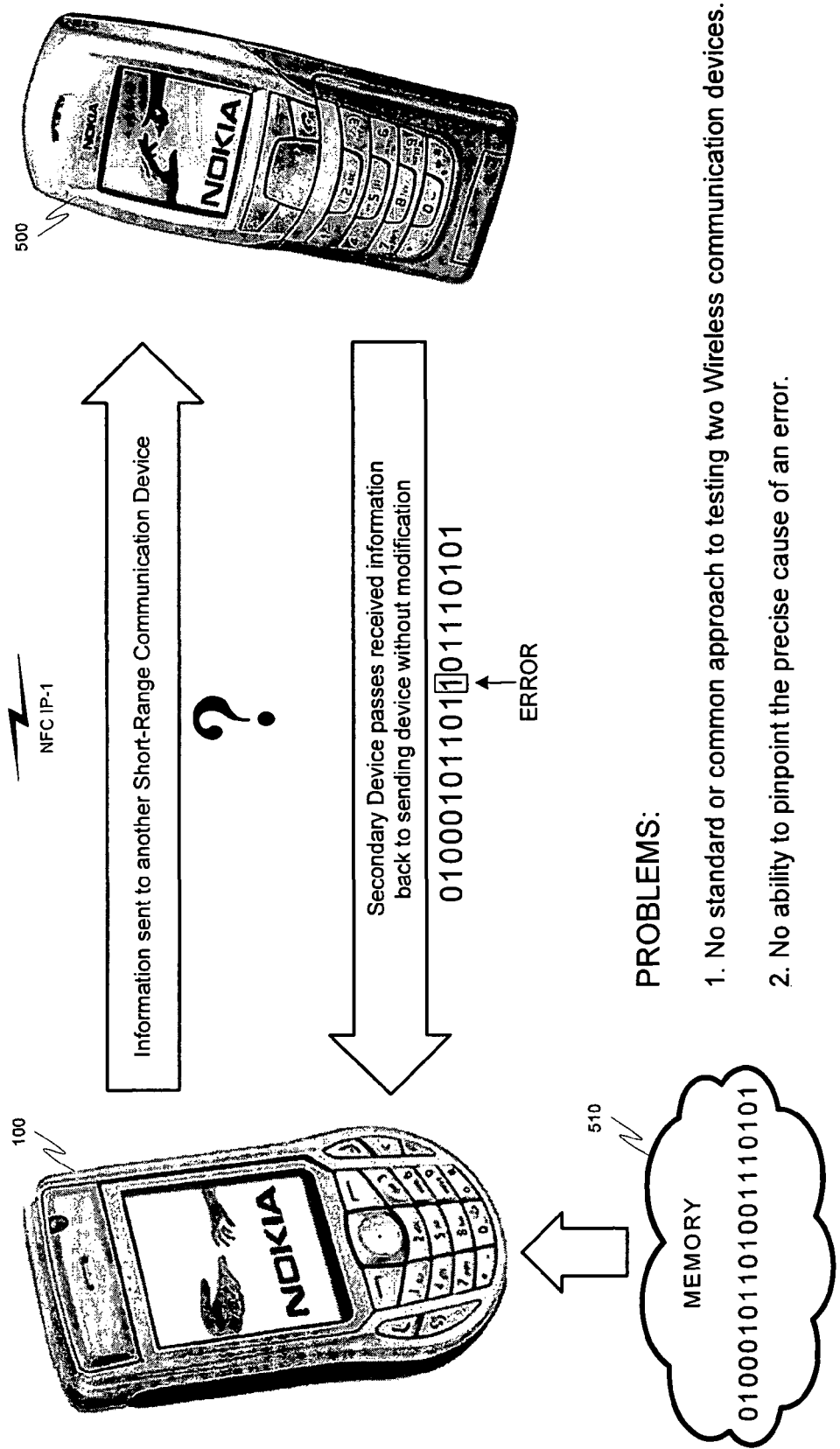
FIG. 5 is a representation of a communication quality test performed between two wireless communication devices in accordance with at least one embodiment of the present invention.

The aforementioned system works serviceably in a controlled setting, such as a test lab, to troubleshoot wireless devices. However, what is needed is a more flexible system so that end users, such as WCD owners, salespeople, field technicians, etc. may troubleshoot communication problems. FIG. 5 discloses a testing arrangement without any specialized test equipment. WCD 100 and WCD 500 are in close proximity so that they may communicate via short-range and/or machine-readable communication. These devices are permitted to be from different manufacturers and may have different capabilities as long as they communicate via the same type of wireless communication. WCD 100 establishes a connection with WCD 500 and queries whether resources are available to stage a test. If WCD 500 can comply, a test is initiated. WCD 100 then runs a program that takes test information stored in memory 510 and transmits it to the secondary device. WCD 500 relays the received information (exactly as received) back to the initiating device. WCD 100 may then compare the returned data to the originally sent data (still stored in memory 410) to determine if there are any errors. In the depicted test case it appears that the twelfth bit should be a "0" but is actually a "1". This error would be tallied to determine a BER and/or PER.

WCD 100 and 500 may be owned by two users who are not acquainted, and may operate in an automatic mode to perform tests when resources are available. There are a multitude of triggering events that may be employed to begin a test. For example, WCD 100 may periodically scan for another device within range. Once a secondary device is detected, WCD 100 may request and run a test unbeknownst to the user. In another example, WCD 100 may perform a short-test prior to downloading desired information from another device. This short check ensures that current short-range and/or machine readable connection is stable and will support the successful transmission of data desired by the user. The user may also manually initiate a test. These are merely a couple of example of applicable test situations. The removal of the need for specialized equipment provides for many test combinations.

While the removal of separate test equipment is an improvement, the test itself may also be considered to be inconclusive when trying to debug a communication problem. The tests currently available deliver a number of errors in an overall transaction. They do not help target the source of the errors in either the sending device or the receiving device. The present invention includes features allowing two devices capable of wireless communication to create comprehensive tests which narrow the possible sources of an error using simple and compact test software.

IV. Improvements in the Wireless Communication Test for Narrowing the Sources of Errors FIG. 6 discloses a test data generation table usable in at least one embodiment of the instant invention. This compact data table (256 bytes) takes up little space, and may be stored in the memory of a WCD or any other NFC compliant device. For example the table may be permanently loaded into the general memory of a device, or on a specialized chip, such as an NFC application specific integrated circuit (ASIC). Alternatively, the information may be loaded as needed into a wireless device via various mediums (e.g., long-range wireless, short-range wireless, wired communication, etc.) The test data generation table contains values that may be used as addresses for other table locations. In at least one embodiment, a "seed" address may be randomly selected in order to form test data. Per the value table in FIG. 6, the seed address "0802" contains the value "4B" This hexadecimal value can be converted into binary and may be used to form part of a test string, and also to indicate the next address (interpreted MSB first) in the chain of values that is being concatenated into a test string. In this case the next value is 37, which is added to the binary test string also shown in FIG. 6. The progression after 37 goes to DA then AE then 9E and so on until a binary test string of the desired length has been concatenated. In this manner, a test string of any desired length can be created from a relatively small amount of source data.

Figure 7:
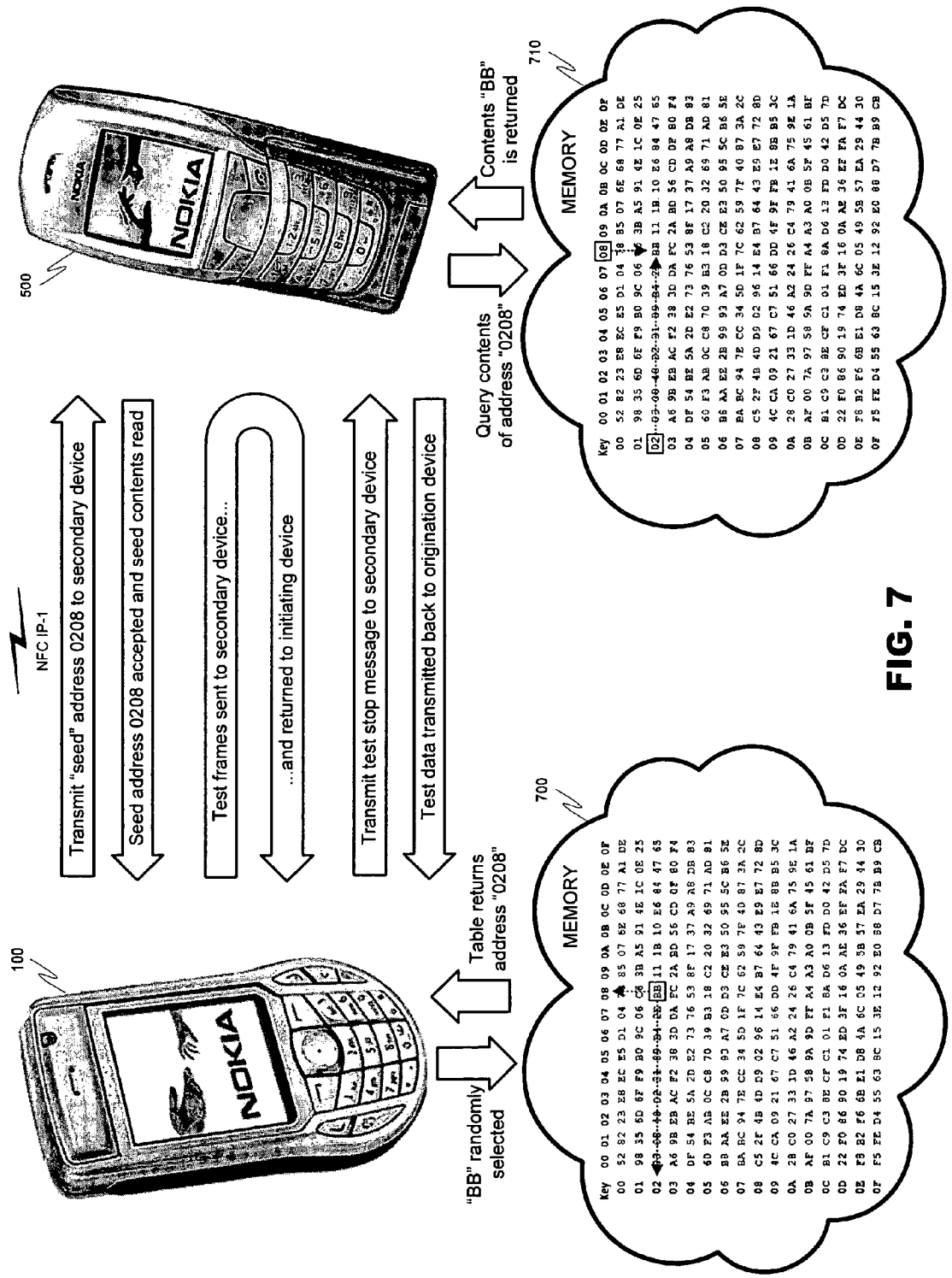
FIG. 7 is a representation of an exemplary communication quality test in accordance with at least one embodiment of the present invention

The data creation method of FIG. 6 is applied to an exemplary test situation in FIG. 7. WCD 100 and WCD 500 are within effective transmission range for short-range communication. Both devices contain the test data generation table in their memories 700 and 710, respectively. WCD 100 initiates communication with WCD 500 and inquires whether resources are available to perform a test. In the FIG. 7 example, the units would be testing resources related to NFC ID-1 communication. WCD 500 may respond affirmatively or negatively. If WCD 500 does not have resources available for a test, WCD 100 may wait for another triggering even such as another wireless communication device entering effective transmission range.

If WCD 500 can participate in the test, WCD 100 may transmit a seed code and other related test parameters to WCD 500. In the present example, the seed code "BB" was selected at random. When WCD 500 receives the address of the seed code "0208", it may access its own version of the value table in memory 710. At this point both devices realize that the starting value for the test will be "BB" or "10111011." The other related test parameters expressed to WCD 500 may include the length of the test (e.g., number of packets, etc.), the assigned response behavior of WCD 500, the statistics to be recorded by WCD 500, etc. WCD 500 uses this information to configure itself appropriately for the test. For example, the expected number of packets allows WCD 500 to assemble an "expected" test data set in memory 710 prior to beginning the test. The behavior of WCD 500 may be configured to emulate a number of different test types. These test types include, but are not limited to, conventional loopback tests, remote and local data validation options, UUT data regeneration, asymmetric data testing, symmetric data testing, etc. These different test types determine how the secondary device will respond to received data, such as mirroring back received data without correction, correcting the received data in accordance with an expected test data set, and interleaved responses including different seed addresses for the transmission and reception phases of the test. Various statistics may be compiled by WCD 500 to be included in an overall test result at the conclusion of a test. These statistics may include counters for header errors, CRC errors, frame oversize and undersize errors. Other parameters may be specified depending on the type of communication being tested and the nature of the devices involved in the test.

The UUT (WCD 100) then begins to send test data frames to the secondary device. Depending on the aforementioned test parameters, WCD 500 may receive and check each frame for errors against the "expected" test data set generated from the value table in memory 710. The compilation of these deficiencies help define possible problems on the transmission phase of the test. WCD 500 then sends data back to the sending unit. If configured in a traditional loopback mode, the data is returned to the initiating unit without any corrections being made. This mode, however, may not help isolate the possible causes of transmission problems. In accordance with the present invention, the secondary device may correct the received information to correspond to the "expected" test data and send it back to UUT. WCD 100 may then check this data using the originally sent data set stored in memory 700. Any deficiencies can then be compiled for the reception phase of the test. The data pertaining to both the transmission and reception phases of the test may then be combined on one of the two devices to arrive at an overall test result.

The test data recorded by both devices may then be analyzed to help isolate the source of a problem. Multiple tests may be correlated in a histogram allowing a user or technician to track the number of errors seen at a specific memory location over time. Errors consistently seen on the transmit phase may be attributed to a problem with the transmitting resources of the UUT. Errors consistently seen on the return phase may be attributed to a configuration problem on the receiver/interpreter of the UUT. These indicators allow for faster and more complete troubleshooting of device behavior. In addition, the secondary device is not limited to being a fully functional WCD. In at least one embodiment of the invention, the secondary device may omit the operator interface features of a traditional WCD, and may simply include the ability to participate in the test and relay test results back to the UUT. An exemplary device would be any commercial apparatus that includes the ability to communicate wirelessly using NFC IP-1, IP-2 (in development) or any other corresponding existing or future protocol.

The present invention is not strictly limited to the process disclosed in FIG. 7. Depending on the "intelligence" of the devices participating in the test, certain steps of the communication may be altered, abbreviated or omitted to increase efficiency or to provide additional features related to communications testing. For example, in some cases the initiating device need not send a seed address to the secondary device. Being that both devices include a copy of the test data generation table, the receiving device may be able to locate the sending device's current position in the table within three error free bytes received. This automated synchronization behavior becomes helpful in specific tests, such as the previously indicated asymmetric data testing, wherein the seed values used in the transmission and reception phase of the test may be different.

Figure 8:
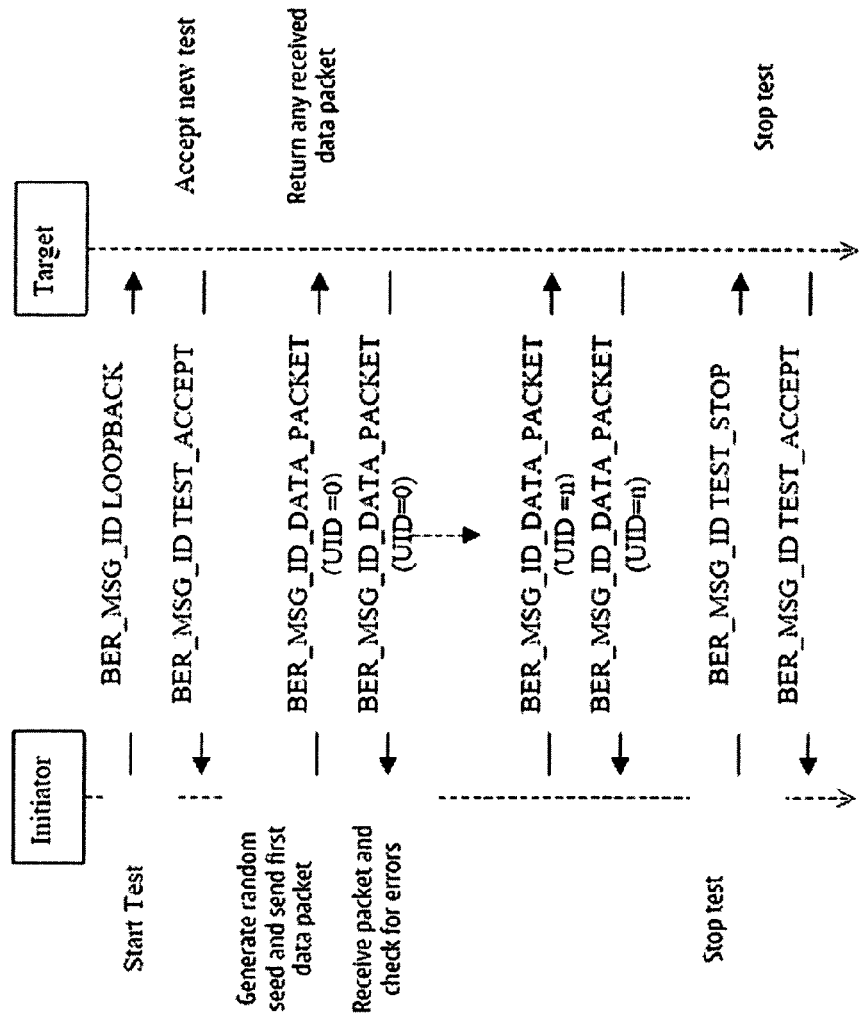
FIG. 8 is an exemplary flow chart for messages involved in a loop back communication quality test in accordance with at least one embodiment of the present invention.
Figure 9:
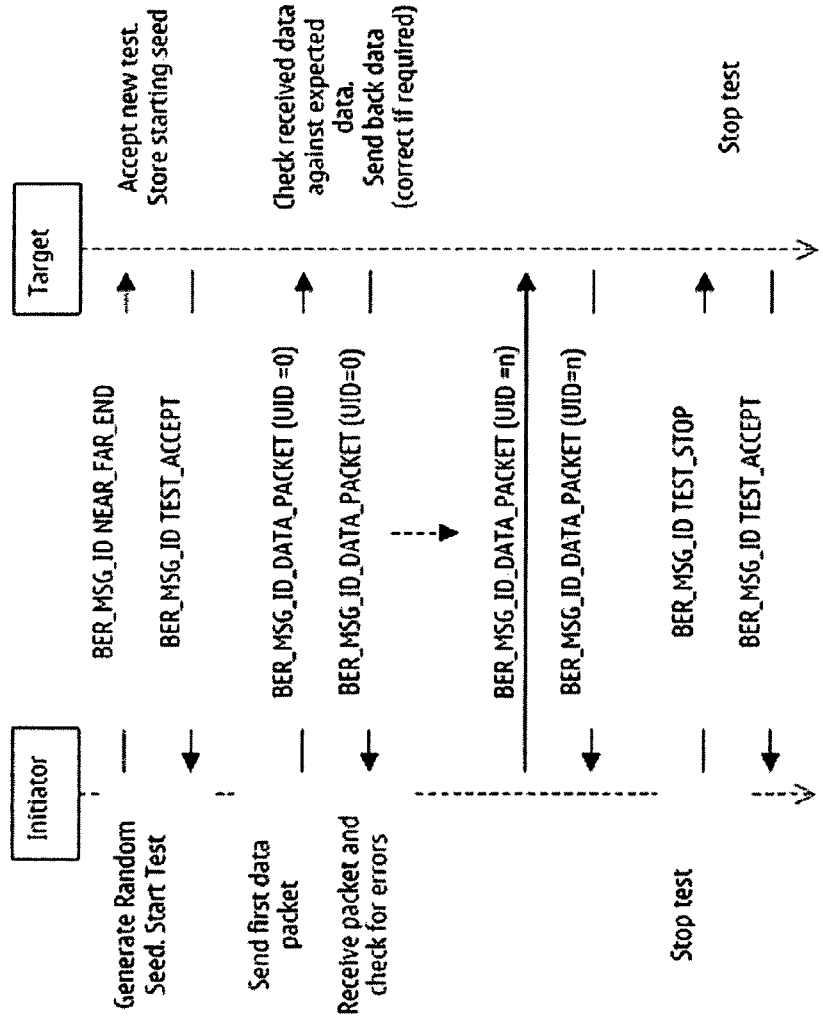
FIG. 9 is an exemplary flow chart for messages involved in a near end-far end communication quality test in accordance with at least one embodiment of the present invention.

FIGS. 8 and 9 describe a flow of transactional messages between an initiating device and a target device in accordance with embodiments of the present invention. FIG. 8 shows a more traditional loopback test wherein the data packets received by the secondary system are returned unchanged to the initiating device. FIG. 9 shows a test message sequence wherein the secondary device corrects received data (if necessary) before returning it to the initiating device.

The present invention presents an improvement over the prior art related to the testing of wireless communication devices. Previous test scenarios required special test resources consisting of both custom hardware and software to test a wireless communication device. The prior art systems also did not facilitate the targeting of the sources or causes of errors because these tests only recorded the errors experienced over the course of the entire communication transaction. The present invention provides a compact and efficient testing system that may be easily standardized to a multitude of wireless devices. The test method helps to target errors seen specifically on the transmission and reception phases of the communication transaction, which may help target the source of potential problems. The portability and effectiveness of the instant invention brings testing out of a controlled environment and provides effective communication quality determinations in any application.

Accordingly, it will be apparent to persons skilled in the relevant art that various changes in forma and detail can be made therein without departing from the spirit and scope of the invention. This the breadth and scope of the present invention should not be limited by any of the above-described exemplary embodiments, but should be defined only in accordance with the following claims and their equivalents.

What is claimed is:

1. A method, comprising:
activating, in response to a triggering event occurring in a device, test software in the unit under test, the test software comprising at least an indexed test data generation table;
establishing test parameters and a seed address in the device;
generating a sequence of encoded test data frames based on the test parameters by traversing through the indexed data generation table starting with the seed address; and
transmitting to a second device, based upon the instructions in the test software, a sequence of test messages comprising the encoded test data frames via short-range wireless communication.

2. The method of claim 1, wherein the device is capable of communicating using radio frequency (RF) near field communication.

3. The method of claim 1, wherein the triggering event includes at least one of a sensing of the second device, a request to download wireless data from a remote source to the device, or a manual action performed by the user on the device.

4. The method of claim 1, wherein establishing test parameters and a seed address in the device comprises transmitting the test parameters and the seed address to the second device via short-range wireless communication.

5. The method of claim 1, wherein establishing test parameters and a seed address in the device comprises receiving test parameters and a seed address from the second device via short-range wireless communication.

6. The method of claim 1, wherein establishing test parameters and a seed address in the device comprises automatically determining a seed address based on received information.

7. The method of claim 1, wherein the device receives a reply sequence of test messages.

8. The method of claim 7, wherein the reply sequence of test messages are corrected in view of an expected sequence of test messages prior to being received.

9. The method of claim 7, wherein error statistics are calculated based on differences between the reply sequence of test messages and the original sequence of test messages.

10. The method of claim 1, wherein test results, including at least error statistics, are received by the unit under test.

11. The method of claim 10, wherein the unit under test compiles the test results to determine an overall test result.

12. A method, comprising:
receiving, in a device, information from which a seed address and test parameters are determined; and
examining, based upon the received information, a sequence of test messages received via short-range wireless communication from a second device, the examining comprising checking encoded test data frames received in the sequence of test messages against expected test data frames generated in the device based on the test parameters by traversing through an indexed test data generation table starting with the seed address.

13. The method of claim 12, wherein the device is capable of communicating using radio frequency (RF) near field communication.

14. The method of claim 12, wherein the test parameters include information for controlling the behavior of the device during the test.

15. The method of claim 12, wherein the device automatically determines a seed address based on the received information.

16. The method of claim 12, wherein error statistics are calculated in the device based on differences between the encoded test data frames and the expected test data frames.

17. A device, comprising:
a memory containing short-range wireless communication test software, and
a processor for activating, in response to a triggering event occurring in the device, the test software in the device, the test software comprising at least an indexed test data generation table, the processor further establishing test parameters and a seed address in the device and generating a sequence of encoded test data frames based on the test parameters by traversing through the indexed data generation table starting with the seed address; and
a transmitter for transmitting to a second device, based upon the instructions in the test software, a sequence of test messages comprising the encoded test data frames via short-range wireless communication.

18. The device of claim 17, wherein the device is capable of communicating using radio frequency (RF) near field communication.

19. The device of claim 17, wherein the test software is able to be installed in an NFC ASIC.

20. The device of claim 17, wherein the test software is permanently installed in the device.

21. The device of claim 17, wherein the triggering event includes at least one of a sensing of the second device, a request to download wireless data from a remote source to the device, or a manual action performed by the user on the device.

22. The device of claim 17, wherein establishing test parameters and a seed address in the device comprises transmitting test parameters and a seed address to the second device via short-range wireless communication.

23. The device of claim 17, wherein establishing test parameters and a seed address in the device comprises receiving test parameters and a seed address from the second device via short-range wireless communication.

24. The device of claim 17, establishing test parameters and a seed address in the device comprises automatically determining a seed address based on received information.

25. The device of claim 17, wherein the device receives a reply sequence of test messages.

26. The device of claim 25, wherein the reply sequence of test messages are corrected in view of an expected sequence of test messages prior to being received.

27. The device of claim 25, wherein error statistics are calculated based on differences between the reply sequence of test messages and the original sequence of test messages.

28. The device of claim 17, wherein test results, including at least error statistics, are received by the device.

29. The device of claim 28, wherein the device compiles the test results to determine an overall test result.

30. A device, comprising:
memory containing short-range wireless communication test software;
a receiver for receiving, in the device, information from which a seed address and test parameters are determined; and
a processor for examining, based upon the received information, a sequence of test messages received via short-range wireless communication from a second device, the examining comprising checking encoded test data frames received in the sequence of test messages against expected test data frames generated in the device based on the test parameters by traversing through an indexed test data generation table starting with the seed address.

31. The device of claim 30, wherein the device is capable of communicating using radio frequency (RF) near field communication.

32. The device of claim 30, wherein the test parameters include information for controlling the behavior of the device during the test.

33. The device of claim 30, wherein the device automatically determines a seed address based on the received information.

34. The device of claim 30, wherein error statistics are calculated in the device based on differences between the encoded test data frames and the expected test data frames.

35. The device of claim 30, wherein test results including at least error statistics are received by the device.

36. The device of claim 35, wherein the device compiles the test results to determine an overall test result.

37. A computer program product comprising computer executable program code recorded on a non-transitory computer readable storage medium, the computer executable program code causing a computer processor to perform steps comprising:
activating, in response to a triggering event in a device, the test software comprising at least an indexed test data generation table in the device;
establishing test parameters and a seed address in the device;
generating a sequence of encoded test data frames based on the test parameters by traversing through the indexed data generation table starting with the seed address; and
transmitting to a second device, based upon the instructions in the test software, a sequence of test messages comprising the encoded test data frames via short-range wireless communication.

38. The computer program product of claim 37, wherein the triggering event includes at least one of a sensing of the second device, a request to download wireless data from a remote source to the device, or a manual action performed by the user on the device.

39. The computer program product of claim 37, wherein the code for establishing test parameters and a seed address in the device automatically determines a seed address based on received information.

40. The computer program product of claim 37, wherein the device receives a reply sequence of test messages.

41. The computer program product of claim 40, wherein error statistics are calculated based on differences between the reply sequence of test messages and the original sequence of test messages.

42. The computer program product of claim 37, wherein test results, including at least error statistics, are received by the device.

43. A computer program product comprising computer executable program code recorded on a non-transitory computer readable storage medium, the computer executable program code comprising:
short-range wireless communication test software on a device, the test software comprising at least an indexed test data generation table;
code for receiving, in the device, information from which a seed address and test parameters are determined; and
code for examining, based upon the received information, a sequence of test messages received via short-range wireless communication from a second device, the code for examining further comprising code for checking encoded test data frames received in the sequence of test messages against expected test data frames generated in the device based on the test parameters by traversing through the indexed test data generation table starting with the seed address.

44. The computer program product of claim 43, wherein the test parameters include information for controlling the behavior of the device during the test.

45. The computer program product of claim 43, wherein the device automatically determines a seed address based on the received information.

46. The computer program product of claim 43, wherein error statistics are calculated in the device based on differences between the encoded test data frames and the expected test data frames.

47. A system, comprising:
a device;
a second device;
short-range wireless communication test software comprising at least an indexed test data generation table installed on both the device and the second device, and
a processor in the device for activating, in response to a triggering event occurring in the device, the test software in the device for establishing test parameters and a seed address in the device and for generating a sequence of encoded test data frames based on the test parameters by traversing through the indexed data generation table starting with the seed address, wherein based upon the instructions in the test software, the device communicates a sequence of test messages comprising the encoded test data frames to the second device via short-range wireless communication.

* * * * *